United States Patent [19]

Sample

[11] 4,121,956
[45] Oct. 24, 1978

[54] METHOD FOR LABELLING A PACKAGE

[75] Inventor: Paul Edward Sample, Wilmington, Del.

[73] Assignee: E. I. Du Pont de Nemours and Company, Wilmington, Del.

[21] Appl. No.: 816,016

[22] Filed: Jul. 15, 1977

[51] Int. Cl.² ............................................. C09J 5/06
[52] U.S. Cl. ..................................... 156/80; 53/411; 156/309; 156/327; 426/383; 426/393; 428/349; 40/2 R; 40/2 G
[58] Field of Search ................. B65C/1/00; 426/383, 426/87, 127, 393; 156/309, 327, 80; 428/249, 349; 40/2 F, 2 G, 2 R

[56] References Cited

U.S. PATENT DOCUMENTS

| | | | |
|---|---|---|---|
| 3,026,229 | 3/1962 | Wilcox | 156/309 |
| 3,239,370 | 3/1966 | Thomson et al. | 117/138.8 |
| 3,264,272 | 8/1966 | Rees | 428/461 X |
| 3,373,224 | 3/1968 | Mesrobian et al. | 260/857 L |
| 3,764,458 | 10/1973 | Ziegel | 156/309 X |
| 3,775,239 | 11/1973 | Snow | 264/171 |
| 3,845,163 | 10/1974 | Murch | 260/857 L |
| 3,863,374 | 2/1975 | Ray | 40/306 |
| 3,904,806 | 9/1975 | Waggoner | 428/511 |
| 3,949,135 | 4/1976 | Vercauteren | 426/127 X |
| 3,998,990 | 12/1976 | Iwami et al. | 156/327 X |
| 4,012,277 | 3/1977 | Lundskow et al. | 156/571 |

OTHER PUBLICATIONS

"Surlyn 1601 Resin . . ." Du Pont Co. Bulletin.
Modern Plastics Encyclopedia 1972-1973, pp. 50, 54.
Modern Packaging Encyclopedia 1971, pp. 283, 284, 286, 288, 290, 293.

Primary Examiner—Steven L. Weinstein

[57] ABSTRACT

A labelled package for low temperature use is disclosed. The label, with an ionomer adhesive, is adhered to an outer ionomer surface of the package wrapping by heat seal means and exhibits excellent adhesion at low temperature.

6 Claims, No Drawings

METHOD FOR LABELLING A PACKAGE

This invention relates to labelled packages, particularly for use at low temperatures, and to labelling such packages. Packages having an ionomer film outer wrap and intended for low temperature use can now be made with labels which adhere to the outer wrap even at temperatures considerably below 0° C. The labels have a label face and an ionomer adhesive and can be applied to packages by heat seal methods even when the package contents are frozen and the package outer surface is covered by frost or food fats.

Ionomer film material exhibits excellent water vapor barrier properties and is extremely strong and tough and fat or grease resistant. Ionomer film has become an important packaging material especially for containing foodstuffs.

U.S. Pat. No. 3,775,239 discloses the use of ionomer in heat-sealable bag laminates for foodstuffs. The laminate includes ionomer and a substrate, such as paper; and bags are made with the ionomer as the inside surface and the substrate as the outside surface.

U.S. Pat. No. 3,904,806 discloses a laminate of ionomer and glassine paper which exhibits a particularly effective barrier to oxygen permeation. Use of the laminate having an additional polyolefin layer is disclosed for packaging frozen foods.

It has been difficult to label packages having an outer surface of ionomer in a way that will ensure that the label will remain adhered to the package at temperatures normally encountered in storing frozen foods. It is cumbersome to place labels inside the package beneath the ionomer wrapping film and, moreover, such labelling is not convenient when goods are to be packaged before distribution to a variety of retail outlets. Labels can be stapled or otherwise mechanically attached to the packages but such as inefficient and does not produce an attractive package. Adhesives, either hot melt or pressure sensitive, have generally failed at low temperatures. Labels applied using such adhesives, especially when applied to packages having frozen contents, either fall off of the package or are easily removed without damage to the label or the package at low temperature. Such adhesion failure and loss of labels causes inconvenience and confusion to the retailer and the consumer, and permits tampering and label switching on packages of goods.

In accordance with this invention, a labelled package is provided having a wrapping of ionomer film and a label, including a label face and an ionomer adhesive layer, wherein the ionomer adhesive layer is fused to the wrapping to yield a single layer of ionomer film. The package is especially useful at temperatures below 0° C. A method is provided for labelling a package having contents at a temperature below 0° C. and a wrapping of ionomer film adjacent to the contents comprising heating a label having a label face and an ionomer adhesive layer to a temperature adequate to melt the ionomer adhesive layer and contacting the ionomer adhesive layer of the label with the wrapping of the package to fuse the ionomer adhesive layer with the wrapping.

The ionomer used in the wrapping film and as the label adhesive herein refers to ionic copolymers made by neutralization of free acid in copolymers of alpha-olefins and alpha,beta-ethylenically unsaturated carboxylic acids. The neutralization is accomplished by means of an ionizable metal compound including cations of sodium and zinc and the like. Ionomers most often used in this invention have ethylene as the alpha-olefin, methacrylic acid as the carboxylic acid, and zinc or sodium as the neutralizing cation. The copolymers are at least about 50 mol percent alpha-olefin and up to about 25 mol percent unsaturated carboxylic acid. About 10 to 90 percent of the free carboxyl groups present therein are neutralized. The copolymers soften at about 55° to 80° C. and melt at about 85° to 100° C. The melt index, determined by ASTM method D-1238, is about 1-100 grams/10 minutes. The softening temperature is known as the Vicat temperature and is determined by ASTM method D-1525. Melting temperatures are determined by differential thermal analysis in accordance with ASTM method D-3418-75. Ionomers are generally described in U.S. Pat. No. 3,264,272 and those materials can be used in this invention.

Ionomer film used in the wrapping for packages of this invention can be unlaminated, single-layer, film or it can be one of two or several laminate layers adhered together to yield a composite wrap with an outer ionomer layer. For example, polyamide or polyethylene can be used together with the ionomer to achieve particular heat seal film characteristics. Moreover, the wrap can include fillers or dyes as required or desired for a particular purpose so long as ionomer forms the exterior surface of the package. Ionomer wrapping herein referred to includes single-layer film and such laminates wherein the ionomer forms the outer package surface. The wrapping film is about 0.01 to 0.25, and preferably about 0.05 to 0.15, mm thick. Clear ionomer film unlaminated with other materials has been found particularly useful in wrapping red meat cuts because the ionomer film provides a water vapor barrier while permitting transmission of enough oxygen to maintain the red color of the meat during storage. In such packages, the ionomer wrapping is directly adjacent to the meat surface to simultaneously provide product display and product protection.

Labels include a label face and an ionomer adhesive layer. The label face can be of any material which provides a surface capable of receiving information, such as paper or textile or a synthetic material such as spun-bonded polyolefin. The label face can be adapted or treated to receive machine printing, handwriting with pen or crayon, photo or chemical developed indicia and the like. The label can be a single ionomer layer with a face of information receiving character.

The label is constructed such that the ionomer adhesive layer is intimately adhered to the label face. In the case of nonporous label faces, the label face material and the ionomer adhesive layer are fused together under conditions of heat and pressure adequate to assure a permanent bond of materials. In the case of porous or fibrous label face material, the ionomer adhesive layer is melted into fibers or pores of the label face to yield a label with an adhesive layer inseparable from the label face. Ionomer adhesives can be joined with label face material by any means to provide a permanent bond, such as by extruding molten ionomer onto label face stock followed by application of pressure, or by simply applying heat and pressure to a layer of adhesive on a layer of label face. Additional polymeric film can be included over the label face to protect the label face from smudging or tearing. Such protective polymeric film can be applied by melt pressing or by means of another adhesive and can be polyolefin, such as polyethylene and polypropylene, polyamide, polyvinylidene chloride, and the like. Protective polymeric film material can also be applied as a solution or latex coating composition. Ionomer can also be used as a protective polymeric film.

Paper is the preferred label face material. Any paper, filled or not, colored or bleached and coated or uncoated can be used. The paper should be of appropriate weight and flexibility for any particular application and should have surfaces receptive to the ionomer adhesive layer on one side and some acceptable information printing means on the other side.

The ionomer adhesive layer is about 0.005 to 0.05, preferably about 0.01 to 0.03, mm thick. While it is preferred that the same type of ionomer be used in the adhesive layer and the wrapping, such is not necessary. For example, a sodium-neutralized ionomer could be used in wrapping film and a zinc-neutralized ionomer could be used in the adhesive layer without adversely affecting operation of the invention.

Labels are applied to packages by heating the label above the melting temperature of the ionomer adhesive layer and then contacting the molten ionomer adhesive layer with the wrapping on the package. Labels can be applied while the contents of the package are at any temperature below about 100° C. A surprising aspect of the application of the labels resides in the discoveries that labels can be permanently applied to packages having contents at a temperature of less than 0° C. and as low as less than −75° C. and that labels can be permanently applied to packages having a surface, at the point of label application, covered with frost or food fats.

For application of labels to packages having contents with a temperature less than 0° C., it is advantageous to heat the label to a temperature substantially above the ionomer softening temperature. While the heat from the label face and molten ionomer adhesive is not sufficient to melt the package contents and may not be sufficient to melt the ionomer wrap through its thickness, it is believed that the excellent label-to-wrap adhesion is due to a mutual fusing of the two ionomer materials, although only a slight thickness of the wrap film may be actually melted. The result is, at the areas of contact, a single, somewhat thickened, layer of ionomer film. Due to the variety of kinds of package contents and the large range of packing and storage temperatures for the contents, the preferred temperature for the molten ionomer adhesive layer cannot be definitely specified for all cases. It can be said that temperatures of, from the ionomer softening point (Vicat temperature) to about 150° C. above the softening point can be used and that temperatures from 30° C. to 100° C. above the softening point are preferred. In any labelling operation, the benefit of the invention will be realized to the extent that molten ionomer adhesive at any temperature causes the above-described fusion with ionomer wrap film.

Contact between the label and the package can be effected by any pressing means. For example, a heated label can be held against the surface of a package by hand pressures or a label can be applied by means of an automatic labelling machine which heats the label, holds the package, and contacts the label with the package at a predetermined pressure. The degree of pressure is not important except that force is necessary which is adequate to provide contact between the label and the package. It has been determined that a pressure of about 3.5 to 70 kPa (2–10 psig) is adequate. It has also been determined that a time for application of that pressure should be from about 0.5 to 10 seconds with about 1 to 3 seconds preferred.

Quality of adhesion between a label and a package is readily evaluated by pulling the label from the package. Such a test is utilized in the examples which follow. When a paper label face is used, good adhesion is indicated by a tearing of the paper. Fiber tear, wherein some paper remains on the package after pulling the label, indicates that the bonds between the label adhesive and the package wrap and between the label adhesive and the label face are greater than the internal strength of the paper itself.

Packages of this invention, especially packages for use at temperatures below 0° C., have labels adhered to the outer ionomer wrap with adhesion forces which persist at low temperatures and which are sufficiently strong that when a label with a paper face is pulled from the package while the package contents are at a low temperature, there is major fiber tear over the area of the label face. Where a strong label face material is used, good label adhesion is indicated by a breach of the package wrap. Any degree of fiber tear indicates adhesion; and fiber tear over 50% of the label face area is considered to be acceptable. Some labels with pressure sensitive adhesive systems exhibit fiber tear when pulled rapidly from a package but are easily removed without fiber tear when pulled slowly. Such labels are commercially undesirable because labels can be removed or switched from package to package without detection.

DESCRIPTION OF PREFERRED EMBODIMENTS

Ionomer used in the following examples, both as adhesive and as wrapping, is sodium-neutralized ionomer exhibiting a Vicat temperature of about 71° C. and a melt index of about 1.3, such as the material sold by E. I. du Pont de Nemours and Company under the trademark designation "Surlyn" 1601.

Example 1

Label laminate is manufactured by extruding a layer of ionomer about 0.025 mm thick onto a kaolin clay coated paper label stock about 0.075 mm thick. The temperature and pressure utilized at the point of contact between ionomer and label stock is such as to cause a surface impregnation of the paper stock fibers by ionomer. The label laminate is cut into label pieces of convenient size, for example, about 5 × 5 centimeters.

Flat, 0.25–1.0 kilograms, cuts of beef are wraped tightly in a film of ionomer having a thickness of about 0.075 mm. The packages can be made by hand or by means of a commercially available automatic packaging system such as that provided by E. I. du Pont de Nemours and Company under the trademark designation "Bivac." The packages are cooled to a temperature of about −30° C.

As a test of the proper temperature for application of labels to the frozen meat packages, labels are heated on a thermostatically controlled plate for approximately 10 seconds and the frozen package is then applied directly to the label. The labels are contacted with the package using a slight pressing force for about 2 seconds. The temperature of the plate is varied and adhesion of labels applied to the package at various temperatures is determined by pulling the labels away from the packages. Th packages are stored at about −30° C. for about 8 hours before the pulling and the contents of the packages are maintained at that temperature during the pulling. In all tests, the labels are pulled at a rate most likely to minimize fiber tear. Results are indicated below:

| Plate Temperature (° C) | Adhesion (% label face-fiber tear) |
| --- | --- |
| 107 | None |
| 121 | 5% |
| 135 | 30% |
| 149–154 | 80% |
| 177 | 100% |
| 204 | 100%, label stock browning |

EXAMPLE 2

Packages of meat made in Example 1 are labelled using a commercial labelling device, such as the device identified as Model 2000, sold by Hobart Manufacturing Company, Troy, Ohio. The label heating pad is maintained at a temperature of about 117° C. and the pad dwell time (contact time of the label with the package) is set at 1.5 to 2 seconds. The ionomer surface of four packages is wiped clean and dry and the ionomer surface of four other packages is smeared with bacon grease. The eight packages are chilled to about −30° C. and labels are applied. The packages are stored at about −30° C. for several hours before pulling the labels. Excellent adhesion is demonstrated on all packages, with fiber tear of greater than 80% for all labels.

EXAMPLE 3

As a test of operation at extreme conditions, packages made in Example 1 and containing frozen meat are immersed for 15 seconds in a refrigerant (such as the material sold by E. I. du Pont de Nemours and Company under the trademark designation "Freon" 12) at a temperature of about −30° C., immediately labelled using the labelling device under labelling conditions of Example 2, and reimmersed in the refrigerant for another 15 seconds. The packages are removed from the refrigerant and the labels are immediately pulled, evidencing about 80% fiber tear.

COMPARATIVE EXAMPLES

Exact formulae for commercial adhesive systems are not generally available. Commercial adhesive systems can be characterized as either pressure-sensitive systems or hot melt systems. Pressure-sensitive systems are permanently tacky and exemplary formulations are believed to include a base of synthetic butyl rubber or natural rubber or a combination of those rubbers plus a rosin or petroleum derivative resin and a plasticizer. It is believed that acrylic and polyvinylacetate acrylate compounds are also utilized in pressure-sensitive systems. Hot melt systems operate either as heat sealing compositions or as molten compositions having delayed adhesive action. Exemplary formulations of heat sealing compositions are believed to include polyethylenevinyl acetate or ionomer resin dispersions or the like combined with wax modifiers and other additives. Exemplary formulations of delayed action compositions are believed to include solid crystalline plasticizers such as dicyclohexylphthalate, diphenylphthalate, or butylbenzolphthalate along with a rubber latex binder and a rosin or petroleum derivative resin.

Labels are made using several commercially available adhesive systems from the above-described categories and are applied to packages and tested as described in the above Examples.

While a particular hot melt adhesive system of the heat sealing variety is found to exhibit a maximum of 90% fiber tear within a narrow plate temperature range of 150° ± 10° C. using clean, dry, packages, the adhesion is found to decline to 20% fiber tear or less outside that temperature range. Moreover, labels with adhesive of the heat sealing variety applied to packages coated by bacon grease as in Example 2, evidence no fiber tear. Labels with the heat sealing adhesive tested under conditions of Example 3 can be brushed off of the packages by merely rubbing a hand over the label.

Labels using delayed action adhesive systems are found to exhibit a maximum of about 50% fiber tear within optimum temperature ranges, as determined under conditions of Example 1, but labels with those adhesives evidence no fiber tear when tested under conditions of Example 2 and can be easily brushed off of the packages when tested under conditions of Example 3.

Pressure-sensitive adhesive systems do not require increased label temperature for label application and labels using such adhesive systems are found to exhibit a maximum of about 50% fiber tear when tested at the conditions of Example 1 and pulled rapidly. Labels with pressure-sensitive adhesive can be pulled from the packages without fiber tear by pulling the label slowly. Labels tested under conditions of Examples 2 and 3 are easily removed without fiber tear by pulling the labels at any rate. One adhesive system, apparently a combined pressure-sensitive and delayed action composition, exhibits a 90% fiber tear tested under conditions of Example 1, but evidences no fiber tear when tested under conditions of Examples 2 to 3.

What is claimed is:

1. A method for labelling a package having contents at a temperature below 0° C. and a wrapping of ionomer film adjacent to the contents comprising cooling the package and its contents to a temperature below 0° C.

heating a label having a label face and an ionomer adhesive layer to a temperature adequate to melt the ionomer adhesive layer contacting the ionomer adhesive layer of the heated label with the wrapping of the cooled package to fuse the ionomer adhesive layer with the wrapping.

2. The method of claim 1 wherein the contents of the package is at a temperature of less than −20° C.

3. The method of claim 2 wherein the label face is paper and wherein adhesion forces between the label and the wrapping of the labelled package are such when the label is pulled from the package while the package contents are at a temperature of about −30° C., there is fiber tear over at least 50% of the area of the label face.

4. The method of claim 1 wherein the label is heated to a temperature of about 30° to 100° C. above the softening temperature of the ionomer adhesive.

5. The method of claim 4 wherein the heated label is contacted with the wrapping under a pressure of at least 3.5 kPa.

6. The method of claim 5 wherein the pressure is maintained for 0.5 to 10 seconds.

* * * * *